A. SUNDH.
CONTROLLING APPARATUS FOR ELECTRIC RAILWAY CARS.
APPLICATION FILED NOV. 11, 1905.
1,160,959.
Patented Nov. 16, 1915.
2 SHEETS—SHEET 1.
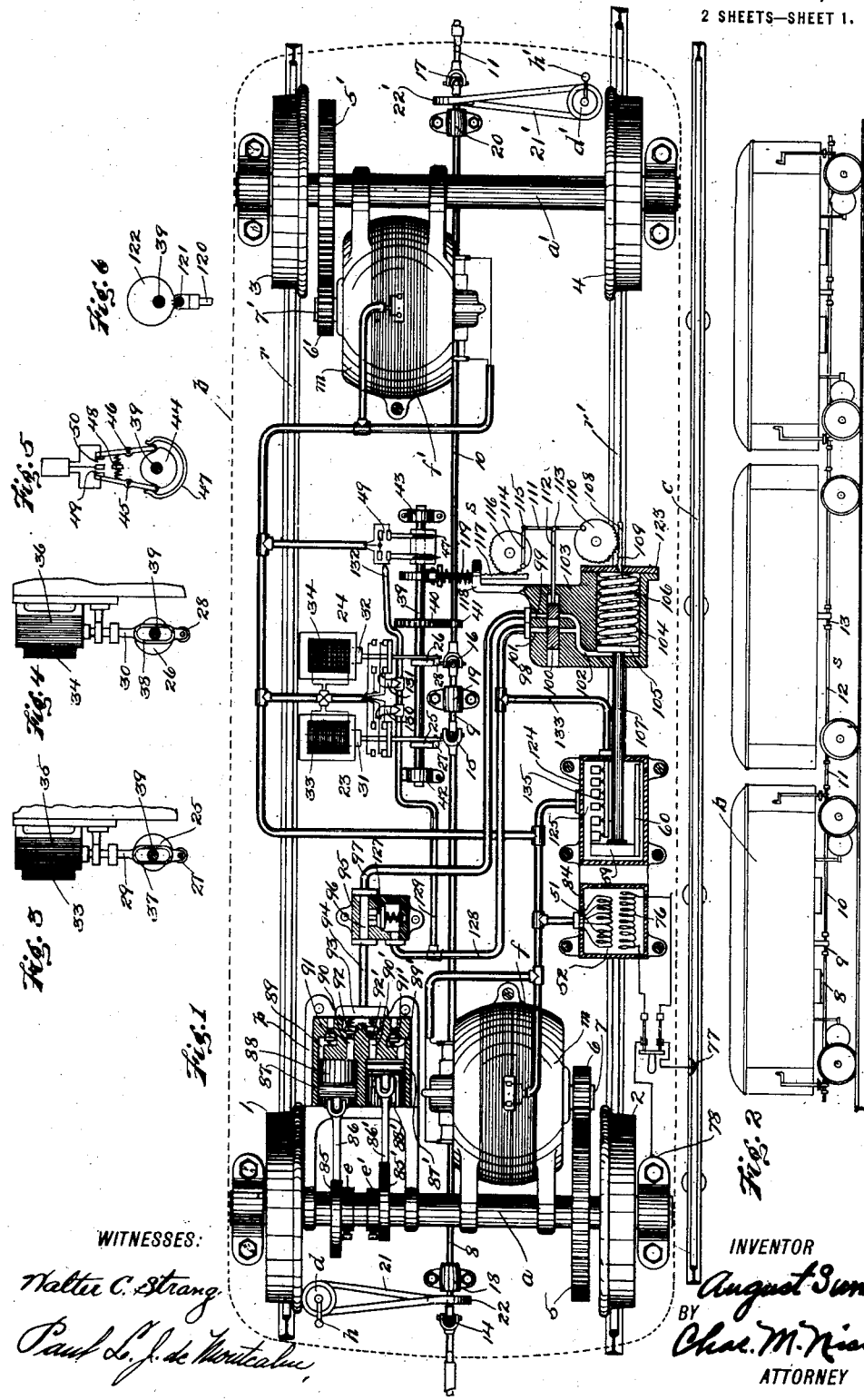
WITNESSES:
INVENTOR
August Sundh
BY
Chas. M. Nissen
ATTORNEY

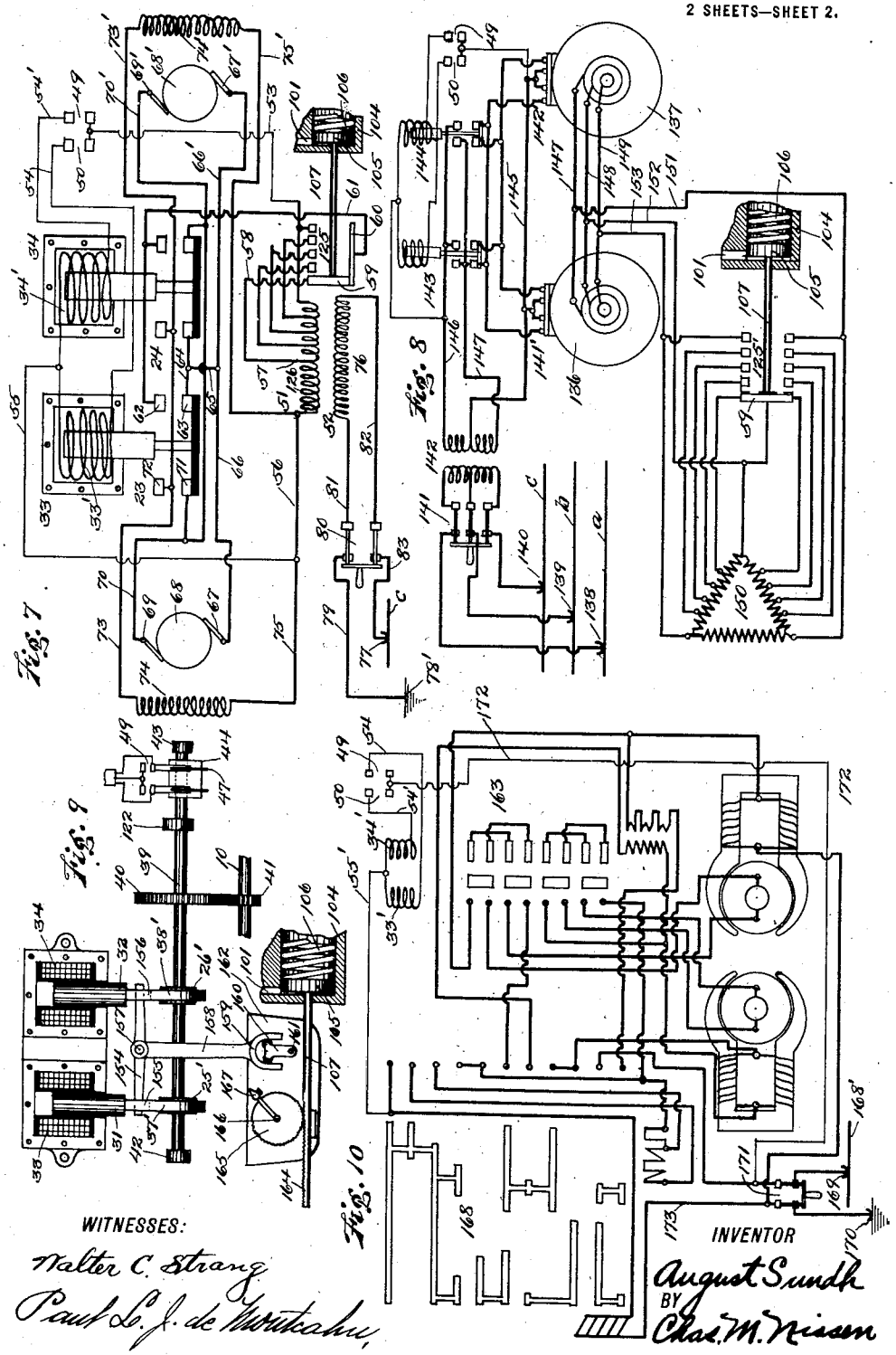

UNITED STATES PATENT OFFICE.

AUGUST SUNDH, OF YONKERS, NEW YORK, ASSIGNOR TO OTIS ELEVATOR COMPANY, OF NEW YORK, N. Y., A CORPORATION OF NEW JERSEY.

CONTROLLING APPARATUS FOR ELECTRIC-RAILWAY CARS.

1,160,959.  Specification of Letters Patent.  Patented Nov. 16, 1915.

Application filed November 11, 1905. Serial No. 286,963.

*To all whom it may concern:*

Be it known that I, AUGUST SUNDH, a citizen of the United States, and resident of Yonkers, New York, have invented a certain new and useful Improvement in Controlling Apparatus for Electric-Railway Cars, of which the following is a specification.

My invention relates to controlling apparatus for one or more cars electrically propelled and is an improvement of the apparatus disclosed in my Patent No. 646,889, granted April 3, 1900.

One of the objects of my invention is the provision of simple and efficient means dependent upon the speed of the car for accelerating the propelling means.

A further object of the present invention is to provide means for controlling series alternating-current motors to effect an acceleration of the same in accordance with their speed.

More particularly it is the object of this invention to provide fluid pressure apparatus dependent for its operation upon the speed of the car for controlling the electric propelling means.

Other objects of the invention will appear hereinafter, the novel combinations of elements being pointed out in the claims.

In the accompanying drawings, Figure 1 represents a plan view of the controlling apparatus connected to a car, the car body being shown in dotted lines. Fig. 2 represents a train of cars operatively connected together. Figs. 3, 4, 5 and 6 are details of the controlling apparatus. Fig. 7 shows a diagram of the circuits and connections for the motor-controlling means of series alternating-current motors of the direct current type. Fig. 8 is a modified wiring diagram which shows the circuits for induction motors when used. Fig. 9 shows a modified form of apparatus which is adapted to series-parallel control of the motors shown in Fig. 10. And Fig. 10 shows diagrammatically one system of wiring for series-parallel control of motors when employing direct current for operating the train-operating apparatus.

Referring now to Fig. 1, it will be seen that $b$ represents the car body to which are suitably connected the axles, $a$, $a'$ on the ends of which are secured the journal bearings on which revolve the car wheels 1, 2, 3 and 4. $r$, $r'$ designate the rails, $c$ the contact or third rail, and $m$, $m'$ the alternating-current motors having the laminated pole frames $f$, $f'$, respectively. The motors $m$, $m'$ are rigidly attached to and supported by the axles $a$, $a'$ respectively, and are geared to the car wheels 2 and 3 by means of the gear wheels 5, 6 and 5', 6', the gears 6, 6' being fixed to the armature shafts 7, 7'. The motors being thus directly connected with car wheels 2, 3, it is obvious that when the car is in motion the motor armatures will have a corresponding speed and consequently a voltage corresponding to its speed may be applied without delay.

Extending from one car to another longitudinally under the cars throughout the length of the train is a controlling shaft $s$, comprising a plurality of rotatable rods, 8, 9, 10, 11, 12, 13, etc. joined together by universal couplings 14, 15, 16, 17, etc., said rods being supported by suitable bearings such as indicated at 18, 19 and 20. Although I prefer to use a controlling shaft thus constructed, the universal couplings may be omitted if desired and flexible sections of the shaft connected between the cars, or any other connecting means may be used. In order to rotate the shaft $s$, I have in this instance shown a belt 21 engaging a pulley 22 on the section 10, and also the drum $d$ which may be revolved by means of the controller handle $h$. Obviously gear mechanism may be employed in place of the belt and connections or a frictional driving means may be used, or any other suitable means for transmitting motion may be employed. In whatever manner the shaft $s$ is rotated by the manually operated handle $h$, it is apparent that when one handle $h$ is moved, all the sections throughout the train may be moved at the same time, and consequently also the mechanism connected therewith and hereinafter described. That is, since a controller handle $h$ or $h'$ is placed on every platform, the train may be operated from any selected platform. Means for disconnecting all the controller handles except the one to be operated may also be provided.

The reversing switches, 23 and 24, for the alternating-current motors $m$, $m'$, are normally locked in open position by means of the cams 25, 26, which engage at points of their concentric peripheries with anti-friction rollers 27, 28, respectively, at the lower ends of the stems 29, 30 of the cores 31, 32, of the magnets 33, 34. The switches are thus held positively in open position and therefore cannot be accidentally closed by any vibration of the cars or trucks. Since the magnets each have a single coil and have laminated frames 35, 36, it is evident that they are adapted to single phase alternating currents as well as to direct currents. Preferably the cores of these magnets are also laminated. In order to hold the rollers 27, 28, in proper position with respect to the cams 25, 26, the stems 29, 30 are respectively provided with slotted portions 37, 38, which fit over the auxiliary shaft 39. This shaft carries the cams 25, 26 and also the gear 40 which meshes with the pinion 41 fixed on the inner end of the section 10 of the longitudinal controlling shaft s. It will be noticed that although the cams 25 and 26 are alike, they are placed in reversed positions with respect to each other on the auxiliary shaft 39. Also fixed to the auxiliary shaft 39, between the bearings 42, 43, is an additional cam 44, which is provided with two concentric portions of different diameters. Adapted to be actuated by the cam 44 are double sets of switch levers 45, 46 (Fig. 5) which are held in engagement with said cam in this instance by means of the springs 47, 48. The switch levers control the double sets of contacts 49 and 50, in that the lever 45 is positively actuated to close the contacts 49 when the cam 44 is rotated in a direction corresponding to the movements of the hands of a clock, and the lever 46 is positively actuated to close the contacts 50 when the cam 44 is rotated in the opposite direction.

The closure of one or the other of the contacts 49 or 50 will result in the energization of one of the reversing magnets 33 or 34. Assuming the contacts 50 to have been closed, a circuit will be established from the secondary 51 of the transformer 52 by way of wire 53, contacts 50, wire 54, to coil 33' of the reversing magnet 33 and thence by wires 55 and 56 back to the secondary 51. The reversing switch 23 will now be closed and a circuit may now be traced from the point 57 of the secondary 51 by wire 58 to and through the bridge contact 59, strip 60, wire 61, contacts 62, 63, and wires 64, 65, where the circuit divides, one part extending through wire 66, brush 67, armatures 68, brush 69, wire 70, contacts 71, 72, wire 73, field 74, wires 75, 76, to the secondary 51; the other part extending through the wire 66', brush 67', armature 68', brush 69', wire 70', contacts 71, 72, wire 73', field coil 74', and wire 75' to the secondary 51. It will be noticed that by reason of the connection of the contacts 71, 72 with both the armatures and field, the motor armatures and fields are connected in series-parallel. If the contacts 49 had been closed, the reversing switch 24 would have been operated to reverse the connections through the armatures and field coils of both series motors.

In Fig. 1 the transformer 52 is shown inclosed in a casing 84, the primary having one terminal connected through the wires 82, 83 and switch 80 to the contact shoe 77 which engages the third rail c. The other terminal of the primary is connected through the wires 81, 79 and switch 80 to the car wheel 2 at 78, this ground being indicated in Fig. 7 at 78'. By opening the switch 80 the single phase or direct current supply would be entirely cut off.

It is desirable to apply minimum voltage to the motors at starting and to gradually increase this voltage to a maximum as the motors increase in speed. In order to accomplish this result I divide the secondary into a plurality of sections and provide automatic means for inserting said sections, the amount of secondary in circuit at any time depending upon the position of the controlling handle on the platform of the car. That is, the amount of voltage to be applied to the motors will correspond to the position of the operator's controlling handle, the voltage being varied whether the handle is moved in one direction or the other, but in any case the variation of voltage will of necessity be gradual by reason of the fluid pressure apparatus which I am now about to describe. Any other suitable voltage regulator than that shown may be used if desired.

Mounted on the axle a is a fluid actuator for producing fluid pressure or for propelling fluid which is to be directed to the means for actuating the voltage regulator. The means herein shown is an air pump p, which is supported in this instance from the axle a. On the axle a are secured two eccentrics e, e', on the straps 85, 85' of which are connected by the rods 86, 86' to the pistons 87, 87'. These pump pistons 87, 87' are arranged to reciprocate alternately in the cylinders 88, 88' respectively, the eccentrics e, e', being reversely arranged. The cylinders 88, 88' are here shown as a single casting and provided with passages 89, 90 and 89', 90', normally closed by the puppet valves 91, 92, 91', 92', respectively. The passages 89, 89' communicate with the outside air, and their valves 91, 91' are movable inwardly, while the passages 90, 90' communicate with a chamber 93, and the valves 92, 92' are movable toward said chamber to open the passages. It is therefore evident that when the piston 87 is drawn to the left, air is drawn into the cylinder 88, through the passage 89, and at the same time the piston 87' is moved to the right and the air in the cylinder 88' forced through the passage 92' into the chamber 93. This operation is reversed when the pistons move in the opposite directions. For every revolution of the axle $a$, each piston completes a cycle, and since while one piston is acting to draw in a supply of air the other is forcing air into the chamber 93, a nearly constant flow of the fluid is produced to said chamber. The construction of the fluid actuator may be varied as desired. The rate of supply, and consequently the pressure, thus procured will obviously vary with the speed of the car.

The pump chamber 93 is connected by a pipe 94 to an independent chamber 95, which is provided with a passage 96 to establish communication between said pipe 94 and a pipe 97 which leads to the valve controlling mechanism 98.

Various modified valve mechanisms may be employed by those skilled in the art, and the one herein shown is only one form and merely illustrative. The casting 103 is provided with the passages 99 and 101 which may communicate with the passage 102 but are normally closed by the reciprocating valve 100. This valve is connected by the stem 112 with the lever 111 at the pivotal point 113. The lever 111 is pivoted at its lower end to the segment gear 110 near the latter's periphery, and at its upper end to the additional lever 114 which is pivoted to the segment gear 116 near its periphery.

A bracket 118 extends from the casting 103 and serves as a guide for the stem 120 (Fig. 6) and to assist in retaining the spring 119 in proper position. The lower end of the stem 120 is a rack 117 which is in mesh with the segment gear 116 while its upper end is provided with an anti-friction roller 121 which engages an eccentric cam 122 which is secured to the auxiliary shaft 39 hereinbefore described. The spring 119 always tends to press the roller 121 against the periphery of the eccentric cam 122 so that when the valve 100 has been moved to the right by the downward movement of the stem 120, the valve and connections will be automatically returned to closed position, when the eccentric cam 122 is returned to its original position, or that shown in Fig. 6.

Referring again to the valve mechanism, it will be seen that the passage 102 leads to a cylinder 104, in which is placed a strong spring 106 between the head plate 123 and the piston 105, which is rigidly secured to the piston rod 107. A stem 108 is also shown passing through the axis of the spring 106 and provided with a rack 109 on an extension outside the cylinder 104, this rack meshing with the segment gear 110.

The piston rod 107 extends to the left through the casing 124, in which are placed a series of contacts 125, which are connected to the sections of the secondary, as shown in Fig. 7. The bridge piece 59 is suitably connected to the end of the piston rod 107 and is adapted to engage the strip 60 as well as the contacts 125. When the valve 100 is opened from the passage 99 to the passage 102, the air under pressure acts on the piston 105 to cause the same to move to the right against the action of the spring 106, thus moving the bridge piece 59 to the right and so also the rack 109. The rate of compression of the spring 106 varies with the increase in the fluid pressure applied. The effect of this operation will be to move the segment gear 110 in an anti-clockwise direction and the valve 100 to closed position. As soon as the valve is closed the piston will be held in the position to which it has been moved as the fluid is confined in the cylinder 104 and therefore cannot escape. The bridge piece 59 will also be held in its predetermined position and consequently a predetermined voltage will be applied to the motors.

The extent of movement of the bridge piece is primarily determined by the position to which the operator moves his controller handle $h$ or $h'$, for the greater the movement of the segment gear 116 the greater must be the movement of the gear 110 to bring the valve 100 back to closed position to effect a holding of the bridge piece 59 in the desired position. With this arrangement it should be noted that it is impossible for the operator to cause too large a voltage to be applied to the motors, and thus injure them, even though he turn his controller handle to the limit of its movement in a short space of time, for, when the car is started, the voltage that will be applied will be that corresponding to the section 126 of the secondary, and no more sections can be added until the car has run a predetermined distance.

If the car is at a standstill and the controller handle be moved, the motors will be started, the voltage corresponding to the section 126 of the secondary being applied, but the motors will not be accelerated until the car has been started and moved a predetermined distance, for, even though the valve 100 is open, no fluid pressure will be exerted on the piston 105 until the air pump has been operated for a short time. The capacity of the air pump is such as to insure a gradual movement of the bridge piece 59 and a step by step addition of the secondary coils of the transformer. In starting up and operating to full speed, it is evident that the motors will increase in speed, and as they do so the air pump will work faster to accelerate the pressure on the piston 105, which is resisted by the gradually increasing strength of the compressed spring. The rate of acceleration of the motors is therefore automatic, dependent upon the speed of the car, and is accomplished safely in a minimum space of time.

It will be noticed that when the valve 100 is closed and the car is moving, the air will be confined in the tube 97 and the pumps would act as a brake to stop the car. I therefore provide a safety valve 127, which is shown in Fig. 1 in the form of a poppet valve. This valve opens into the chamber 134 of the casing 95, which chamber communicates with the passage 101 through the pipe 128 and also with the nozzles 130, 131 and 132, through the pipe 129. A branch pipe 133 connects the pipe 128 with the series of nozzles 135 within the casing 124. When the valve 100 is closed, or even when open, and the pressure in the pipe 97 is too great, the air escapes past the valve 127 to the pipe 128 and flows from the nozzle 135 against the contacts 125 to keep them clean and cool; the air flows also through the pipe 129 and out of the nozzles 130, 131 and 132, to keep clean and cool the contacts of the reversing switches 23 and 24, and the contacts 49 and 50 (Figs. 5 and 7). The air directed by these nozzles also blows out any arcs that may form at the adjacent contacts, but this is particularly the case when the valve 100 is moved to its extreme left-hand position, and the air to the left of the piston 105 exhausted through the passages 102 and 101 and through the pipes 128, 129, 133 and the nozzles 130, 131, 132 and 135. This is for the reason that when the controller handle $h$ or $h'$, is moved by the operator to original position, the eccentric cam 122 is positively actuated to the position shown in Fig. 6, thereby releasing the rack 117, which the spring 119 now moves upwardly. This will cause the segment gear 116 to be moved in a clockwise direction, and the valve 100 to the left to establish communication between the passages 102 and 101. As the air escapes from the space to the left of the piston 105, the rack 109 is moved in the same direction as the piston, and this operation effects a rotation of the gear 110 in clockwise direction to cause the valve 100 to be moved back to central position.

At the same time that the eccentric cam 122 is rotated, the cams 25 and 26 are positively actuated to separate the contacts of the reversing switches. It should be noted that since this operation is not automatic, as by a spring or weight, but positive, being actuated by the operator on the platform at the controller handle $h$ or $h'$, the contacts will always be separated and never stick together so as to cause injury to the controlling apparatus.

It will be seen that the controller handles in each car has a central position from which it is moved in one direction to cause the car to go ahead, and another position to reverse the movement of the car. In one case the contacts 49 are closed and the stem 30 released, so that the reversing switch 24 will operate, and in the other case the stem 29 will be released and the contacts 50 closed to effect the operation of the reversing switch 23. In either case the eccentric cam 122 will actuate the rack 117 and consequently the valve 100.

In Fig. 7, I have shown my invention applied to the operation and control of single-phase alternating-current motors of the direct-current type, but in order to illustrate the flexibility of my system I have shown in Fig. 8 two alternating-current motors 136 and 137, preferably of the induction type, connected in parallel with each other, and the controlling circuits therefor.

$a$, $b$, $c$ designates the trolley wires of a three phase system, and 138, 139 and 140 the trolleys or sliding contact devices, which engage therewith. From these trolleys circuits lead to and through the three pole switch 141 to the primary of a transformer 142, the secondary of which is connected by wires to the binding posts 141' and 142' of the induction motors and also to the contacts of the reversing switches 143 and 144.

When the construction diagrammatically illustrated in Fig. 8 is used, it should be understood that the same is substituted for that shown in Fig. 7. That is, the same mechanical controlling apparatus is used as before, only the electrical apparatus being changed, so that the mode of operation is substantially the same as heretofore explained. It may be pointed out, however, that when the contacts 50 or 49 are closed, a single phase circuit is closed through either the coil of reversing switch 143, or the coil of reversing switch 144. Furthermore, 145 designates the common return for the secondary mains, the connections of the other secondary mains 146 and 147 to the outside motor terminals 141' and 142' being reversed by the reversing switches in order to reverse the direction of rotation of the motors.

Connected in parallel with the rotor circuits by means of slip rings, brushes and leads, is the sectional starting resistance 150. Although the brushes are directly connected with each other by the leads, 147, 148 and 149, it should be noted a circuit cannot be completed from one secondary phase to another except through the resistance 150 which is connected to said leads by the wires 151, 152, and 153, respectively. With all the resistance 150 in the circuit with the rotors of the motors, said motors will start with a strong torque but at a slow speed. As the car begins to move, however, the piston 105 will also be moved in a manner heretofore explained, the effect being the connection of the contacts 125' by the bridging piece 59 and the consequent gradual short-circuiting of the sections of the resistance 150 until the entire resistance is cut out. The car or train will therefore be started from rest and be gradually accelerated to full speed without any jerking.

Referring now to Figs. 9 and 10, it will be seen how my invention may be applied to the well known series-parallel control of direct-current motors. The mechanical apparatus is somewhat modified in that the cams 25, 26, are replaced by or changed to eccentrics 25', 26' respectively. In the eccentric rods 155 and 156 which connect the eccentric straps 37', 38', and the cores 31, 32, respectively, are holes for the reception of the ends of the lever 154, which is pivoted at 157. Instead of holes, suitable projections may be provided if desired. To the central portion of the lever 154 is rigidly secured the operating lever 158, which has a forked outer end 159 in engagement with the lever 160 to transmit motion to the latter. This lever is fastened to the shaft 161 which is pivoted vertically in the controller box 162 and carries the movable contacts of the reversing switch designated by the number 163 in Fig. 10. Also pivoted vertically in the controller box 162 is a shaft 166, which carries a series of movable contacts 168 of the accelerating switch for varying the speed of the motor. The various connections which this switch may make are enumerated on page 3 of my Patent No. 646,889, granted April 3, 1900, for an improvement in controller for electric railway cars. Also secured to the shaft 166 so as to move therewith is a segment gear 165 having an indicator 167 and being in mesh with the rack 164 on the rod 107, which is secured to the piston 105 of the pneumatic cylinder 104.

The novel features in Fig. 10 comprise the magnet coils 33' and 34', which are connected to the normally open switches 49 and 50 by the wires 54 and 54', respectively, and by wire 172 to the two pole switch 171, contact shoe 169, and the third rail or positive main 168'. The other terminals of the magnet coils are both connected permanently by wire 55' to the wire 173 which leads through the switch 171 to the ground 170.

The operation of the construction shown in Figs. 9 and 10 will now be explained: The operator on the car platform moves the controller handle h or h' in one direction or the other, depending upon which direction it is desired to have the train run. The interconnecting shafts s throughout the train are thereby rotated, and so also the auxiliary shafts 39 connected to the cars having driving motors, as for example every other one (see Fig. 2). The cam 44 will then positively actuate the levers 45 or 46 to close the switches 49 or 50 and thus energize the magnet 33 or 34. At the same time that the cam 44 is rocked, either the eccentric 26' or 25' moves the eccentric rod 156 or 155 in an upward direction, and thereby effects a movement of the levers 159, 158 and 160. This will cause the reversing switch 163 to be moved to circuit-closing position and the motors will therefore be started. As the car is consequently set in motion, the air pump p (see Fig. 1) is operated to move the piston 105 against the action of the spring 106. The rod 107 and rack 164 are therefore moved and the accelerating switch 168 set in its next position to increase the speed of the car. This immediately has the effect of increasing the air pressure on the piston 105, and therefore the switch 168 will be set in its third position, and so on until the car is accelerated gradually up to full speed in minimum space of time and yet without any jerking or sudden movements.

Although I have herein disclosed the preferred embodiment of the principles of my invention I desire it to be understood that I do not wish to be limited to the details or arrangement of parts shown and described as the same may obviously be varied by those skilled in the art without departing from the spirit and scope of my invention.

What I claim and desire to have protected by Letters Patent of the United States is:—

1. The combination with a train of cars, of means for moving said train, a source of electric power conducted to the train, a source of fluid power dependent upon the motion of said train and proportional in strength to the speed of the train, and means for controlling said powers from any selected platform of said train of cars to effect the operation of said moving means.

2. The combination with a train of cars, of electric power conducted to said train, a source of compressed fluid power operated by the motion of said train and proportional in strength to the speed of said train, actuating apparatus to move the train, and means for controlling from any platform the application of said powers to control the train.

3. The combination with a railway car, of fluid propelling means connected to the mechanism of the car, and driven thereby only when the car is in motion, of a plurality of motors for driving the car, starting switches for the said motors, electrical means for closing a circuit for said starting switches, mechanical means operated from any platform for closing the circuit for said starting switches and coöperating with the electric power in controlling the starting switches, and means operated by the fluid from said fluid propelling means to control the acceleration of the car.

4. The combination with a railway car, of a driving motor, motor controlling apparatus, a fluid actuator for operating said motor-controlling apparatus, a pilot valve for controlling said actuator, and means entirely mechanical for operating said pilot valve from either or both platforms of the car.

5. The combination with a railway car, of a driving motor, motor-controlling means, means for operating said motor-controlling means, a pilot valve for controlling said operating means, and mechanical means for operating said pilot valve from either platform of the car.

6. The combination with a railway car, of a driving motor and controlling means therefor, a fluid actuator for operating said controlling means, a pilot valve for controlling said operating means, means connected to either platform of the car for moving said valve from normal position, and means actuated by said operating means for returning said valve to normal position.

7. The combination with a railway car, of motor-controlling means, a fluid actuator for operating said motor controlling means, a pilot valve for controlling said operating means, means connected to either platform of the car for moving said valve to supply or exhaust position, and means for effecting an automatic closing of said valve.

8. The combination with a railway car, of a driving motor, motor-controlling means, fluid propelling apparatus for operating said means directly, a valve for controlling said apparatus, gear mechanism connected to said valve, and means connected to both platforms of the car for operating said gear mechanism from either platform to open said valve.

9. The combination with a railway car, of fluid propelling means, a controlling valve therefor, a piston connected to the part to be actuated and arranged to be moved by the propelled fluid, means connected to both car platforms for moving said valve from either platform to open position, and means connected to said piston for effecting an automatic closing of the valve.

10. The combination with a railway car, of a driving motor, motor controlling means, fluid pressure apparatus for operating said means in proportion to the speed of the car, and mechanical means connected to either platform of the car for controlling said fluid pressure apparatus.

11. The combination with a railway car, of a driving motor, accelerating apparatus therefor, a piston connected to said accelerating apparatus, a spring acting upon one side only of the piston to move the same in one direction, fluid-pressure apparatus acting upon the other side only for moving the piston in the opposite direction, a valve for controlling the supply of fluid to act against said piston, and means connected to both car platforms for actuating said valve from either platform to open or close the same.

12. The combination with a railway car, of a driving motor, and controlling means therefor, fluid-actuating apparatus for operating said means directly, and means for controlling said operating means from either car platform to produce any desired speed of the motor and car.

13. The combination with a railway car, of a driving motor, motor-controlling means, means for operating said motor-controlling means, mechanical means for operating said operating means, and manual means connected to either or both of the car platforms for moving said mechanical means to effect a speed of the car dependent upon the position of said manual means.

14. The combination with a railway car, of an electric driving motor, motor-controlling means, operating means for said motor-controlling means, mechanical actuating means for said operating means, and a controller lever on both platforms of the car for moving said mechanical actuating means to effect a speed of the car to correspond with the position of said controller lever.

15. The combination with a railway car, of a driving motor, means for accelerating said motor, means for regulating the speed of the said motor, and means connected to either or both platforms of the car for operating said regulating means, the time of the acceleration of the motor being independent of the time of movement of said operating means.

16. The combination with a railway car, of a driving motor, means for accelerating said motor in a predetermined number of revolutions, mechanical means for regulating the speed of said motor, and manual means on each platform of the car for actuating said mechanical means, the time of movement of said manual means being independent of the time of acceleration, but the speed of the motor corresponding to the position of said manual means.

17. The combination with a railway car, of one or more driving motors, accelerating means therefor, an air actuator for operating said means, a valve for controlling said air actuator, mechanical connections between said valve and the accelerating means, and mechanical means operated from either car platform for actuating said valve.

18. The combination with a railway car, of an electric driving motor, accelerating mechanism therefor, means for propelling fluid to actuate said accelerating mechanism in proportion to the speed of said motor, mechanical means for controlling the flow of fluid, and manual means on either or both of the car platforms for operating said mechanical controlling means.

19. The combination with a railway car, of a driving motor, a source of power for said motor, a fluid actuator operated by said motor, motor-accelerating means, means for directing fluid from said fluid actuator to operate said accelerating means, mechanical means for controlling the flow of fluid, and manual means for actuating said mechanical controlling means from either of both car platforms.

20. The combination with an electric railway car, of a series wound driving motor, of two sources of power, one being electric and substantially constant in value, the other being fluid pressure and proportional in strength to the speed of said motor, means operated by said electric power for starting said motor, means operated by fluid pressure for accelerating said motor, mechanical controlling means, and manual means from both car platforms for operating said controlling means.

21. The combination with an electric railway car, of a plurality of series wound electric driving motors, of a fluid actuator driven only when said motor operates, starting switches for said motor, electric means for operating said starting switches, mechanical means for closing the circuits to said starting switches, manual means for actuating said mechanical means, and means operated by the fluid actuator for controlling the acceleration of said motors.

22. In an electric train system, the combination with a train of cars, of moving means connected to one or more of said cars, a source of electric power conducted to the train to operate said moving means, a source of fluid power dependent upon the motion of said train and proportional in strength to the speed of the train, and means for controlling said powers from any platform of said train to effect the regulation of said moving means.

23. In an electric train system, the combination with a train of cars, of one or more alternating or pulsating current motors, of the commutator type, for driving the train, of a source of electric supply for said electric motors, fluid propelling means associated with said motors, and means operated by the propelled fluid for controlling the voltage applied to said motors.

24. In an electric train system, the combination with a train of cars, of one or more motors of the direct current type for driving the train, of a source of electric supply for said motors, fluid propelling means associated with said motors, a transformer connected between the source of supply and said motors, means operated by the propelled fluid for varying said transformer to regulate the voltage applied to said motors, and means for controlling said fluid-propelling means from any selected platform.

25. In a train system, the combination with a train of cars, of one or more alternating current motors connected with one or more cars of the train, fluid propelling means connected with one or more of said motors on one or more of said cars, means operated by the propelled fluid for controlling the acceleration of the train, means for controlling the flow of fluid, and means for actuating said fluid-controlling means from any selected platform.

26. In a train system, the combination with a train of cars, of one or more alternating current motors, of fluid propelling means, means operated by the propelled fluid for controlling the acceleration of the train, means for controlling the flow of fluid, a plurality of shafts, one for each car and connected with each other, and means for actuating said shafts from any selected platform to effect the acceleration and operation of said motors.

27. In a train system, the combination with a train of cars, of one or more single-phase alternating-current motors; of starting, stopping, reversing and automatic accelerating means therefor; shafts connected to each other and to said means; and means for actuating said shafts from a selected car platform.

28. The combination with a train having a series wound motor, of motor-controlling apparatus, a fluid actuator, fluid pressure apparatus for operating said means and connected directly to said fluid actuator, a valve for controlling said apparatus, gear mechanism connected to said valve, and means for actuating said gear mechanism manually from two different positions to open said valve.

29. The combination with a railway car, of a series wound motor mounted thereon, a rheostat for said motor, fluid pressure apparatus for operating said rheostat, a spring for quickly returning said rheostat to initial position, and mechanical means for controlling said fluid pressure apparatus.

30. The combination with a railway car, of a series electric motor mounted thereon, reversing switches for said motor, accelerating mechanism and means for operating the same, the latter operating in proportion to the speed of the train, electric means for closing said switches, means for normally holding said switches in open position, and single mechanism for operating said accelerating mechanism.

In testimony whereof, I have signed my name to this specification in the presence of two subscribing witnesses.

AUGUST SUNDH.

Witnesses:
CHARLES M. NISSEN,
D. FISCHER.